United States Patent [19]

Gebhart et al.

[11] 4,258,544
[45] Mar. 31, 1981

[54] DUAL FLUID FUEL NOZZLE

[75] Inventors: Daniel E. Gebhart, East Peoria; Brace C. Smith; D. Craig Young, both of Peoria; Jerry A. Damerell, Washburn, all of Ill.

[73] Assignee: Caterpillar Tractor Co., Peoria, Ill.

[21] Appl. No.: 942,567

[22] Filed: Sep. 15, 1978

[51] Int. Cl.³ .............................................. F02C 7/22
[52] U.S. Cl. ...................................... 60/39.32; 60/742
[58] Field of Search ............... 60/39.74 B, 39.32, 742; 239/397.5, 424, 424.5; 285/133 R, 134, 138, 299-301

[56] References Cited

U.S. PATENT DOCUMENTS

| | | | |
|---|---|---|---|
| 2,812,978 | 11/1957 | Billman | 285/138 |
| 2,933,894 | 4/1960 | Johnson et al. | |
| 3,046,742 | 7/1962 | Egbert et al. | |
| 3,068,026 | 12/1962 | McKamey | 285/138 |
| 3,159,971 | 12/1964 | Moebius et al. | 60/39.74 B |
| 3,319,418 | 5/1967 | Bryant et al. | |
| 3,335,567 | 8/1967 | Hemsworth | |
| 3,426,527 | 2/1969 | O'Connor | |
| 3,458,997 | 8/1969 | Clark | 60/39.74 B |
| 3,938,323 | 2/1976 | Quigg et al. | |
| 3,955,361 | 5/1976 | Schirmer et al. | |
| 4,125,359 | 11/1978 | Lempa | 239/397.5 |
| 4,154,056 | 5/1979 | Emory | 60/39.32 |
| 4,155,220 | 5/1979 | Emory | 60/39.74 B |

FOREIGN PATENT DOCUMENTS 985739 3/1965 United Kingdom ............... 60/34.74 B Primary Examiner—Robert E. Garrett
Attorney, Agent, or Firm—Phillips, Moore, Weissenberger, Lempio & Majestic

[57] ABSTRACT

A fuel nozzle for a gas turbine engine permits alternate use of different fluid fuels such as gaseous or liquid fuels without intermixing until delivery of the fuel to the combustion chamber. The nozzle provides concentric fuel delivery passages and allows for differing rates of expansion between the two passages.

14 Claims, 4 Drawing Figures

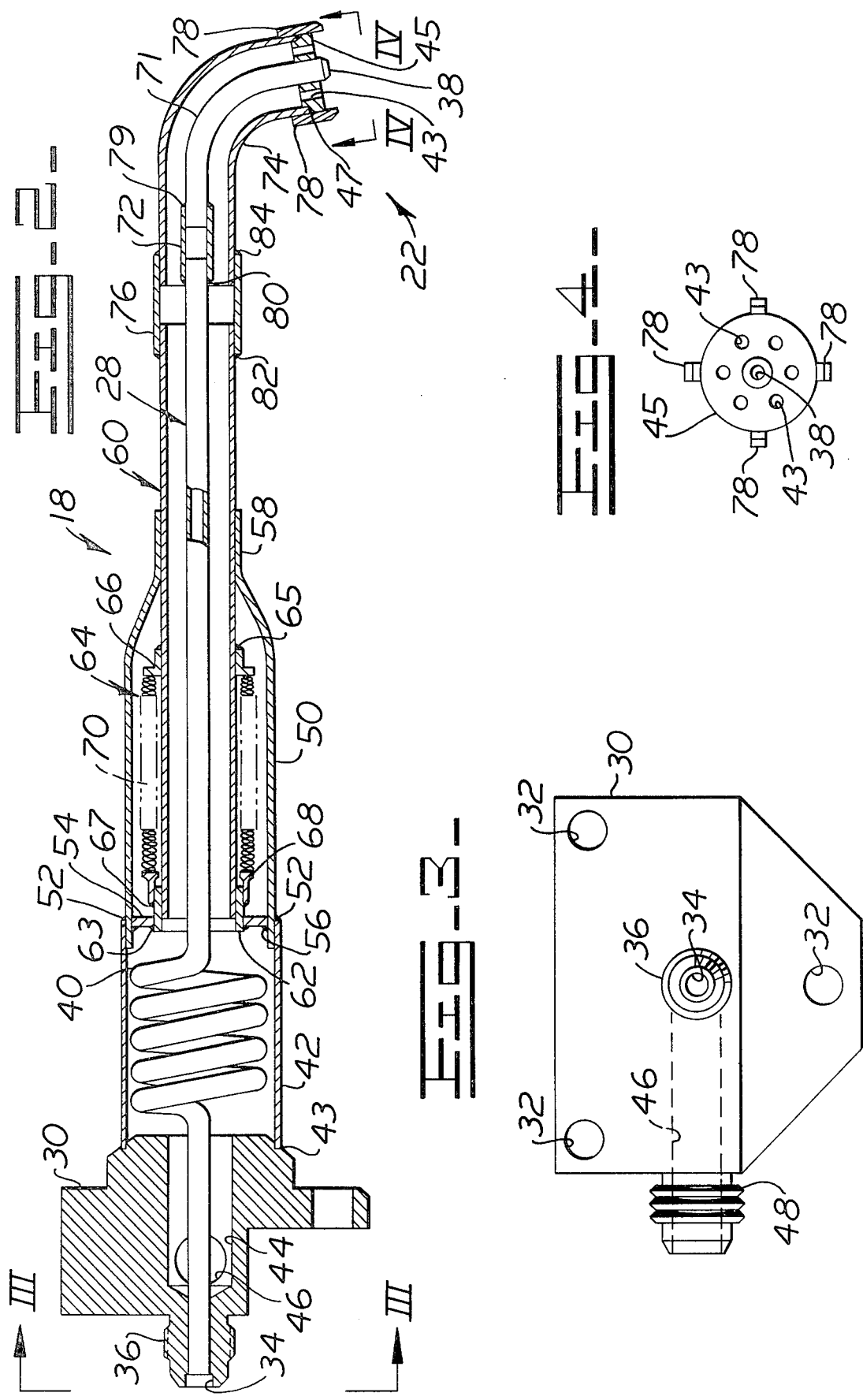

DUAL FLUID FUEL NOZZLE

BACKGROUND OF THE INVENTION

This invention is related to a fuel nozzle for a gas turbine engine. In particular, it deals with a fuel nozzle capable of supplying alternately or simultaneously two different types of fuel, such as liquid or gaseous fuel.

A gas turbine engine depends upon the expansion of a burning fuel to drive the turbine wheel of a gasifier turbine. A gasifier turbine drives a compressor which pressurizes air for mixture with fuel for subsequent burning. Once the expanding burning gas has passed the gasifier turbine stage, power may then be extracted to drive either a power turbine or, in the case of an aircraft, act upon the turbine case in the manner of a jet engine.

The combustion chamber or chambers are generally between the compressor and the gasifier turbine, and are formed either as an annular single chamber, or a plurality of cylindrical chambers circumferentially spaced about the turbine shaft. The burning and expanding fuel is directed by a series of nozzle vanes against the blades of the turbine wheel.

Fuel is communicated to the combustion chamber, or combustion chambers in the case of the cylindrical chambers, through a series of fuel nozzles. In an annular chamber, a plurality of fuel nozzles are circumferentially spaced about the engine each leading into the combustion chamber upstream of the turbine wheel. Fuel is communicated through these nozzles to the combustion chamber for burning therein.

A selected number of the fuel injectors may have fixed in their immediate vicinity a means of ignition generally in the form of a sparking plug. The ignitor is energized upon the turbine reaching a particular speed under the influence of an outside power source. Simultaneously, with the excitation of the ignitor or at a predetermined time thereafter, fuel is communicated to the fuel nozzles where it is ignited due to the high temperature in the immediate vicinity resulting from the ignition source.

It is well known in the art that certain fuels ignite more readily than others. In particular, gaseous fuels or atomized fuels properly mixed with air, are usually more easily ignited than a stream of liquid fuel. Thus, it follows that gas turbine engines may be more rapidly started through the use of gaseous or atomized fuel. On the other hand, the less volatile fuels may be appropriate for use once the engine has been started simply from an economic standpoint. Being able to start on one fuel and operate on another is useful, but the ability to change from one fuel to another without interrupting engine operation is equally important.

The high temperatures associated with a gas turbine engine present unique problems in fuel delivery. In particular, the fuel which is usually at the ambient temperature of the environment is delivered to a combustion chamber which is operating at a high temperature. Therefore, the conduit, or passage, communicating the fuel to the combustion chamber is hot at one end and relatively cool at the other end. If the combustion chamber is fixed at one end to the turbine case, the chamber, because of the heat, will expand linearly relative to the surrounding engine case in which the turbine case is mounted. This expansion and any expansion in the passage communicating the fuel to the combustion chamber from the outside of the engine case, must therefore be absorbed in the passage. In fuel nozzles communicating a single fuel to a combustion chamber, the expansion problem may be taken care of by a means well known in the art such as helical coil in the fuel line.

Ideally, fuel should be communicated to a particular point in the combustion chamber to provide optimum burning, and thus optimum power extraction from the burning fuel. Therefore, if more than one type of fuel is utilized in operation of the engine, fuel must be provided through the same nozzle or replacement nozzles, and may require shutting the engine down to effect fuel change. Provision in the present gas turbine engines for multiple fuel use is generally done through a valving scheme so that a first fuel is communicated to the nozzle through one conduit, while a second fuel is communicated to the same nozzle through a second conduit. This may prevent continuous operation of the engine during fuel shiftover. Since repeated starting of a gas turbine engine in a hot condition may not always be desirable, shut down of the engine for shiftover to a second type of fuel should be avoided, if possible. Since it is advantageous to be able to utilize various types of fuel in an operating gas turbine and further since it may be advantageous to shift from one type of fuel to a second type of fuel during operation, it became apparent that the existing fuel nozzles are inadequate.

SUMMARY OF THE INVENTION

The present invention is directed to overcoming one or more of the problems set forth above.

Broadly stated, the invention is a fluid fuel nozzle assembly for communicating at least two differing kinds of fluid fuel to a gas turbine engine. The fuel nozzle consists of an elongated inner passage assembly for communicating a first fluid fuel. It further consists of an elongated outer passage substantially concentrically mounted about the inner passage for communicating a second fluid fuel. The invention also includes provision for sealingly associating the outer passage about the inner passage to allow the inner passage and outer passage to expand at differing rates.

BRIEF DESCRIPTION OF THE DRAWINGS

FIG. 2 is a sectional view of one of the fluid fuel nozzles shown in FIG. 1.

FIG. 3 is an end view of the fuel nozzle shown in FIG. 2.

FIG. 4 is a detailed view of the nozzle orifices of the fuel nozzle shown in FIG. 2.

DETAILED DESCRIPTION OF THE PREFERRED EMBODIMENT

Figure 1:
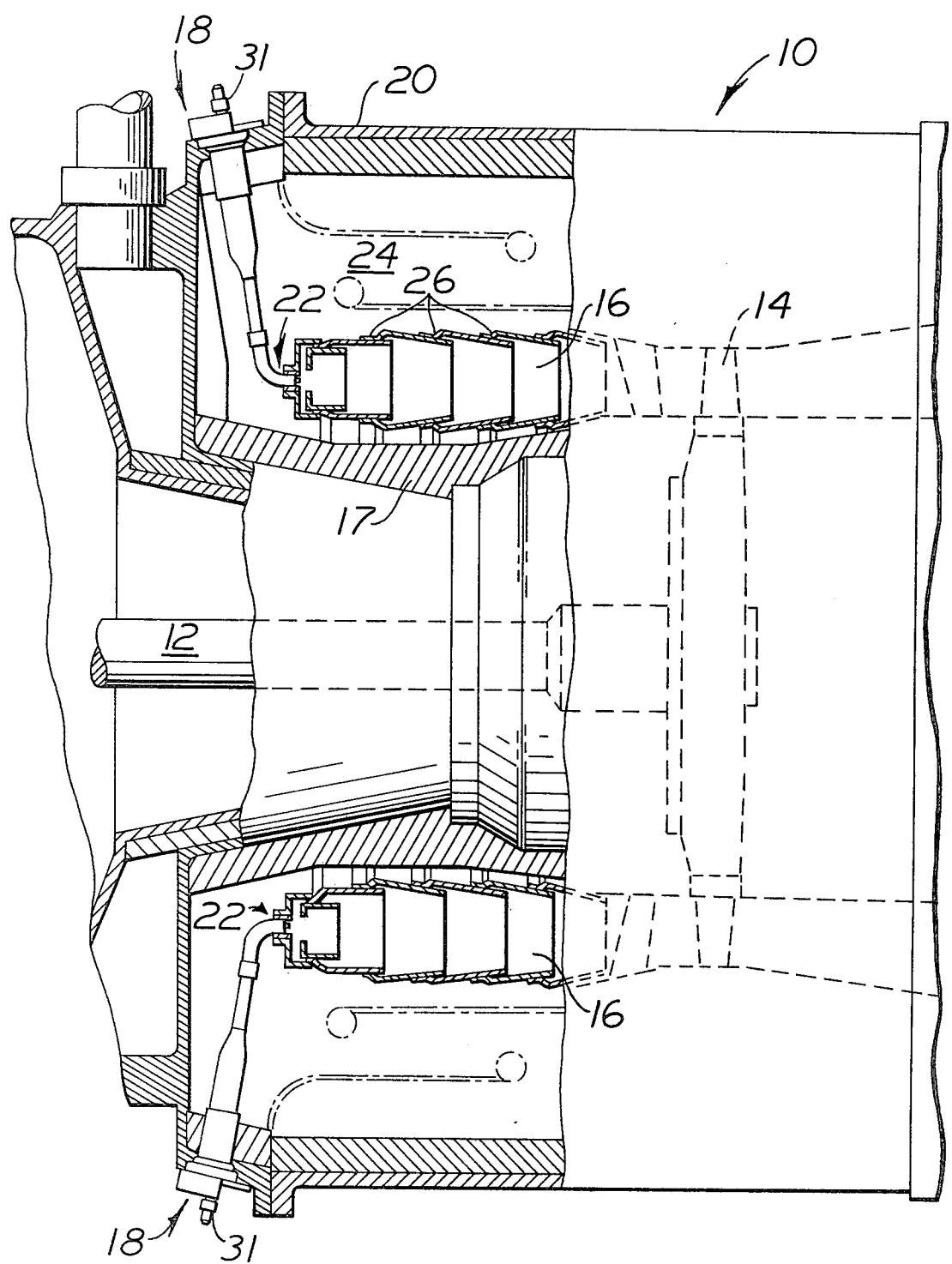
FIG. 1 is a portion of a typical gas turbine engine with the combustion chamber shown in section, and having mounted therein fluid nozzles in accord and with this invention.

A portion of a typical gas turbine engine 10 is shown in FIG. 1. Gas turbine engine 10 is comprised of a compressor (not shown) driven by a shaft 12 which is rotated by a gasifier turbine 14. Turbine 14 is turned by hot gases discharged from a combustion chamber 16 which, in the gas turbine engine 10 shown in FIG. 1, is in the form of an annular ring about turbine shaft 12 and affixed to the turbine case 17 proximate the turbine wheel. As noted in the Background of the Invention, combustion chamber 16 may also be in the form of a plurality of cylindrical members. Fuel is communicated to combustion chamber 16 by a plurality of fuel nozzles 18. Each fuel nozzle 18 is mounted at one end in the engine case 20 while the orifice end 22 of fuel nozzle 18 is positioned in or adjacent the combustion chamber 16 at a predetermined point for best combustion. Air is communicated to combustion chamber 16 through a passage 24 and a plurality of openings 26 in the combustion chamber. The location of openings 26 is selected to communicate the necessary air for proper combustion in combustion chamber 16 and further to provide additional air which may act as a coolant for the relatively high temperatures inherent in gas turbine engines.

Having established the environment in which fuel nozzle 18, which is the subject of this invention, is utilized, reference is now made to FIG. 2 to point out the particular details thereof.

Fuel nozzle 18 consists of an elongated inner passage means such as conduit 28 which is affixed at the end distal of orifice end 22 in a mounting member 30. Mounting member 30 is formed with a plurality of mounting holes 32 (see FIG. 3) to facilitate fixture to engine case 20. A first bore 34 connects conduit 28 to a fitting 36 which may be integrally formed with the mounting member 30. Fitting 36 is adapted for interconnection with a fuel line 31 (see FIG. 1) so that fuel may be communicated to the bore 34 and thence through conduit 28 for communication through open end 38 of conduit 28 and thus into combustion chamber 16.

Conduit 28 is formed with a helical portion 40 intermediate of each end. Helical portion 40 permits thermal expansion of conduit 28 due to the high temperatures of combustion chamber 16 relative to engine case 20.

Surrounding conduit 28 is a second fluid passage means which includes a substantially concentric passage 60 for communicating a second type of fuel to a plurality of small orifices 43 formed in an annular orificed plate 45 which is sealingly affixed about conduit 28 and forms with open end 38 the orifice end 22 of the nozzle 18.

The second or outer passage means surrounds inner passage means formed by conduit 28 and is affixed to mounting member 30 by mounting means which permits the inner and outer passage means to expand at differing rates. The mounting means includes a first cylindrical member 42 by means such as weld 43. Cylindrical member 42 is formed sufficiently large to surround helical portion 40 of conduit 28.

A counter bore 44 is formed in mounting member 30 coaxially with bore 34. Counter bore 44 communicates with a passage 46 formed substantially perpendicular to counter bore 44 and terminating in a fitting 48 (see FIG. 3) affixed to mounting member 30. Fitting 48 is adapted to receive a second fuel line (not shown).

Affixed to cylindrical member 42 by bonding is a second cylindrical member 50 forming a second portion of the mounting means that permits the expansion at the differing rates. Second cylindrical member 50 has an outside diameter substantially equal to the inside diameter of the first cylindrical member 42, thus permitting second substantially cylindrical member 50 to be telescoped in the first cylindrical member 42 prior to the bonding of the two members together by means such as weld 52. Generally coincident with the weld 52 is an annular member 54 bonded to substantially cylindrical member 50 by means such as weld 56.

Cylindrical member 50 is formed with a constricted end 58 adapted to slidingly receive a fluid and gas tight concentric passage 60 in a telescoping manner. Concentric passage 60 has affixed at one end orificed plate 45 by a weld 47 or other appropriate fastening means. Fixture of orificed plate 45 to concentric passage 60 locates conduit 28 generally coincident with the longitudinal axis of concentric passage 60 thus completing the pattern of inner and outer passage means for communication of differing fuels to the orifice end 22 of fuel nozzle 18. It should be noted that conduit 28 protrudes through the axial hole of annular orificed plate 45.

Concentric passage 60 is received at the end distal of orifice end 22 and adjacent first cylindrical member 42 by a sleeve 62 bonded to annular member 54 by a weld 63 or the like. Concentric passage 60 is free to telescope in sleeve 62.

Intermediate constricted end 58 of the cylindrical member 50 and sleeve 62, and surrounding concentric passage 60 interior of cylindrical member 50 is an elongated bellows assembly 64 affixed at a first end thereof to the outer surface of concentric passage 60 and affixed at the other or the second end thereof to the outer surface of sleeve 62. Bellows assembly 64 serves as an expansion joint between concentric passage 60 and sleeve 62 thus forming means for permitting differing expansion rates between the inner and outer passage means.

Bellows assembly 64 has formed at its first end a first annular member 66 having an inside diameter substantially equal to the outside diameter of concentric passage 60 for fixture thereto by a weld 65 or the like. At the second end of bellows assembly 64, a second annular member 68 is affixed to sleeve 62 by a weld 67 or the like. Interconnecting the first and second annular members 66 and 68 is a cylindrical gas tight expansion member such as a bellows 70. Bellows 70 is thus affixed to concentric passage 60 at its first end by first annular member 66 and to sleeve 62 at its second end by second annular member 68. The bellows 70 permits the concentric passage 60 to telescope inwardly and outwardly of sleeve 62 while retaining the gas tight integrity of the outer passage means.

A curved portion 71 of conduit 28 is affixed to the elongated portion of conduit 28 by sleeve 72. Similarly a curved portion 74 of the concentric passage 60 is affixed to the elongated portion of the concentric passage 60 by a sleeve 76. The curved portion 71 of conduit 28 is retained in the concentric relationship with the curved portion 74 of the concentric passage 60 as previously noted by orificed plate 45.

In use, the plurality of fuel nozzles 18 are mounted in gas turbine engine 10 as illustrated in FIG. 1. In particular, a plurality of fuel nozzles 18 communicate fuel to annular combustion chamber 16. A first type of fuel, such as gaseous fuel, may be communicated through passage 46 to the outer passage means comprising cylindrical member 42, cylindrical member 50 through bellows assembly 64 and concentric passage 60 for communication to the combustion chamber through orifices 43.

A second fuel, such as a liquid fuel can be communicated through bore 34 to conduit 28 passing through helical portion 40 en route to open end 38 and thus combustion chamber 16.

With the capability of communicating two different types of fluid fuel to combustion chamber 16 through a single nozzle, it has been found that the engine can be started on a fuel which is relatively easy to ignite and run on a fuel which is economical for continuous operation but more difficult to ignite, without the necessity of shutting the engine down after the engine is warmed up.

In particular, a gaseous fuel may be communicated through bore 46, while a liquid fuel may be passed through bore 34 or vice versa.

As the engine heats up, the expansion means associated with the inner and outer passages, namely helical portion 40 of the inner passage means and bellows assembly 64 of the outer passage means, becomes important.

Bellows assembly 64, which forms a portion of the mounting means associating the outer passage means about the inner passage means, permits differing expansion rates between the two passage means. Specifically, expansion of concentric passage 60 is constrained by interconnection with conduit 28 at orificed plate 45. The constraint imposed by this interconnection is relieved by bellows assembly 64 which associates concentric passage 60 with mounting member 30 through other elements of the mounting means such as cylindrical member 50 and cylindrical member 42. Furthermore, bellows assembly 64 cooperating with helical portion 40 of the inner passage means permits a change in relative position between combustion chamber 16 and engine case 20. In this case, orifice end 22 may expand toward engine case 20 as indicated in FIG. 1 because of expansion of the combustion chamber, thus shortening the absolute length of fuel nozzle 18. Such shortening is taken up in bellows assembly 64 and helical portion 40 without loss of the gas tight integrity of the two passage means. Thus, bellows assembly 64 acting in conjunction with helical portion 40, preserves the relative position of the nozzle in the combustion chamber throughout the engine operation.

Orificed plate 45 when affixed to curved portion 74 has a plurality of longitudinal spacers 78 affixed around the perimeter and overlapping curved portion 74. Reference to FIG. 1 will show that these spacers position the fuel nozzle in the combustion chamber 16.

Curved portions 71 and 74 of fuel nozzle 18 may be assembled with orifice plate 45 and with sleeve 72 initially affixed to curved portion 71 of the conduit 28 by a weld or the like. Sleeve 76 is first positioned about concentric passage 60 and then sleeve 72 slid over the elongated portion of conduit 28 for bonding thereto by a weld 80. Subsequently sleeve 76 may be moved over the gap between the end of the elongated portion of concentric passage 60 and curved portion 74 of the concentric passage 60 for bonding to each of these portions by welds 82 and 84 respectively. It should be noted that welds 79, 80, 82 and 84 and the previously mentioned welds are formed so that the inner passage means, comprising conduit 28 and including sleeve 72 and curved portion 71, is isolated from the outer passage means formed in part by concentric passage 60 and including curved portion 74 and sleeve 76. This feature permits the use of two types of fuel without one fuel intermixing with the other fuel in the fuel nozzle.

Although this invention has been described in relation to a particular embodiment of a gas turbine engine, it should be apparent to those skilled in the art that the fluid fuel nozzle described herein may be used in other types of gas turbine engines, such as axial flow engines.

The embodiments of this invention in which an exclusive property or privilege is claimed are defined as follows:

1. A fluid fuel nozzle assembly for a gas turbine engine having a combustion chamber mounted in an engine case, the nozzle assembly comprising:

elongated inner passage means for communication of a first fluid fuel to the combustion chamber;

elongated outer passage means for communication of a second fluid fuel to said combustion chamber;

mounting means for sealingly associating the outer passage means about the inner passage means and allowing the inner and outer passage means to thermally expand at differing rates while retaining gas tight integrity; and said inner passage means including an elongated conduit having a helical portion and said mounting means including a cylindrical portion substantially surrounding said helical portion.

2. The fluid fuel nozzle assembly set forth in claim 1 wherein the mounting means includes an annular orificed plate disposed about one end of the elongated inner passage means and affixed to the end of the outer passage means, said plate having an axial hole through which said inner passage means protrudes.

3. The fluid fuel nozzle assembly set forth in claim 2 wherein the mounting means includes expansion joint means for associating the other end of the outer passage means with the inner passage means.

4. The fluid fuel nozzle assembly set forth in claim 3 wherein the mounting means includes a mounting member defining a first bore communicating with the interior of the elongated inner passage means, a counterbore communicating with the outer passage means by way of the cylindrical portion, and a second bore substantially perpendicular to the counterbore for communicating fuel thereto, said elongated inner passage means passing through said counterbore; and said cylindrical portion being affixed to said mounting member in general axial alignment with said counterbore.

5. The fluid fuel nozzle assembly set forth in claim 4 wherein the expansion joint means includes a bellows assembly affixed at one end to the outer passage means and associated at the other end with the cylindrical portion.

6. The fluid fuel nozzle assembly set forth in claim 5 wherein the mounting means includes a second cylindrical portion affixed to the first cylindrical portion distal of the mounting member and surrounding the bellows assembly, said second cylindrical portion having a constricted end for telescopically receiving the outer passage means.

7. The fluid fuel nozzle assembly set forth in claim 6 wherein the mounting means includes an annular member having a center hole and a sleeve, said annular member being affixed to the interior of the second cylindrical portion with said sleeve affixed to the center hole of the annular member, and the outer passage means being telescopically received in the interior bore of said sleeve and the other end of the bellows assembly being affixed to the outer surface of the sleeve.

8. The fluid fuel nozzle assembly set forth in claim 2 wherein the inner and outer passage means include concentrically mounted curved portions proximate the annular orificed plate.

9. The fluid fuel nozzle assembly set forth in claim 8 including spacer means for separating the orificed plate from the combustion chamber, said spacer means having a plurality of longitudinal spacers affixed around the perimeter of the curved portion of the outer passage means.

10. A fluid fuel nozzle assembly comprising:

elongated inner passage means for communication of a first fluid fuel therethrough;

elongated outer passage means for communication of a second fuel therethrough;

means for associating the outer passage means about the inner passage means while allowing the outer passage means to expand at a different rate than the inner passage means;

said inner passage means including an elongated conduit having a helical portion; and the mounting means having a cylindrical portion substantially surrounding said helical portion.

11. The fluid fuel nozzle set forth in claim 10 wherein the elongated inner and outer passage means communicate fuel to the same respective one end from the respective other end, and wherein the means for associating the outer passage means about the inner passage means includes mounting means having expansion joint means for associating the other end of the outer passage means with the inner passage means.

12. The fluid fuel nozzle assembly set forth in claim 11 wherein the mounting means includes a mounting member defining a first bore communicating with the interior of the elongated inner passage means and a counterbore communicating with the outer passage means by way of the cylindrical portion, the mounting member further defining a second bore substantially perpendicular to the counterbore for communicating fuel thereto, said elongated inner passage means passing through said counterbore; and said cylindrical portion being affixed to said mounting member in general axial alignment with said counterbore.

13. The fluid fuel nozzle assembly set forth in claim 11 wherein the expansion joint means includes a bellows assembly affixed at one end to the outer passage means and associated at the other end with the inner passage means.

14. The fluid fuel nozzle assembly set forth in claim 11 wherein the mounting means includes an annular orificed plate disposed about one end of the elongated inner passage means and affixed to the end of the outer passage means, said plate having an axial hole through which said inner passage means protrudes.

* * * * *